(12) United States Patent
Godecker et al.

(10) Patent No.: US 8,245,769 B2
(45) Date of Patent: Aug. 21, 2012

(54) REFRIGERATOR-OVEN COMBINATION FOR AN AIRCRAFT GALLEY FOOD SERVICE SYSTEM

(75) Inventors: William Godecker, Irvine, CA (US); Farzin Kohanloo, Carlsbad, CA (US)

(73) Assignee: Be Intellectual Property, Inc., Wellington, FL (US)

( * ) Notice: Subject to any disclaimer, the term of this patent is extended or adjusted under 35 U.S.C. 154(b) by 184 days.

(21) Appl. No.: 12/763,960

(22) Filed: Apr. 20, 2010

(65) Prior Publication Data
US 2010/0200555 A1 Aug. 12, 2010

Related U.S. Application Data

(62) Division of application No. 11/114,902, filed on Apr. 25, 2005, now Pat. No. 7,721,797.

(51) Int. Cl.
*F25B 29/00* (2006.01)
(52) U.S. Cl. .......... 165/253; 165/61; 165/231; 165/259; 165/263; 99/331
(58) Field of Classification Search .......... 165/61, 165/231, 253, 259, 263; 99/331
See application file for complete search history.

(56) References Cited

U.S. PATENT DOCUMENTS

| | | | |
|---|---|---|---|
| 2,779,171 A | 1/1957 | Lindenblad | |
| 3,216,215 A | 11/1965 | Schuett | |
| 3,744,474 A * | 7/1973 | Shaw | 99/330 |
| 3,818,818 A * | 6/1974 | Hice, Sr. | 99/330 |
| 3,888,303 A * | 6/1975 | Skala | 165/61 |
| 3,952,794 A * | 4/1976 | Spanoudis | 165/61 |
| 4,156,454 A | 5/1979 | Skala | |
| 4,180,125 A | 12/1979 | Schulz et al. | |
| 4,187,325 A * | 2/1980 | Tyree, Jr. | 99/357 |
| 4,346,756 A | 8/1982 | Dodd et al. | |
| 4,426,923 A * | 1/1984 | Ohata | 99/468 |
| 4,700,685 A * | 10/1987 | Miller | 99/330 |
| 4,884,626 A | 12/1989 | Filipowski | |
| 4,890,463 A | 1/1990 | Cantoni | |
| RE33,510 E * | 1/1991 | Williams | 99/443 C |
| 5,052,472 A | 10/1991 | Takahashi et al. | |
| 5,069,273 A | 12/1991 | O'Hearne | |
| 5,093,556 A * | 3/1992 | Oelfke | 219/386 |
| 5,215,000 A * | 6/1993 | Desage et al. | 99/331 |
| 5,235,903 A | 8/1993 | Tippmann | |
| 5,265,437 A | 11/1993 | Saperstein et al. | |
| 5,369,960 A | 12/1994 | Mueller et al. | |
| 5,477,915 A | 12/1995 | Park | |

(Continued)

FOREIGN PATENT DOCUMENTS

JP 06129761 A 5/1984
(Continued)

OTHER PUBLICATIONS

JPO, Office Action in Japanese Patent Application No. 2008-507758 dated Nov. 7, 2011, with English Translation.

*Primary Examiner* — Ljiljana Ciric
(74) *Attorney, Agent, or Firm* — Fulwider Patton LLP

(57) ABSTRACT

A refrigerator-oven combination for an aircraft galley food service system includes a housing with a thermally insulated compartment, a heating device for heating the compartment in a heating mode, and a refrigeration device for cooling the compartment in a refrigeration mode.

16 Claims, 2 Drawing Sheets

U.S. PATENT DOCUMENTS

| | | |
|---|---|---|
| 5,491,979 A | 2/1996 | Kull et al. |
| 5,496,000 A | 3/1996 | Mueller |
| 5,513,500 A | 5/1996 | Fischer et al. |
| RE35,259 E * | 6/1996 | Williams .................... 99/443 C |
| 6,014,866 A | 1/2000 | Durham |
| 6,073,547 A | 6/2000 | Westbrooks, Jr. et al. |
| 6,244,165 B1 | 6/2001 | Trombley et al. |
| 6,619,189 B1 * | 9/2003 | Tippmann et al. ............... 99/330 |
| 6,880,351 B2 | 4/2005 | Simadiris et al. |
| 6,894,252 B2 * | 5/2005 | Paller et al. .................... 99/476 |
| 6,996,334 B1 * | 2/2006 | Parsons et al. ................. 99/330 |
| 7,024,104 B2 * | 4/2006 | Moore et al. .................... 99/330 |
| 7,745,763 B2 * | 6/2010 | Fraccon et al. ................. 99/331 |
| 7,757,601 B2 * | 7/2010 | Lagares Corominas et al. ............................. 99/330 |
| 7,777,158 B2 * | 8/2010 | Saltenis et al. ................ 219/521 |
| 7,820,947 B2 * | 10/2010 | Gaynor et al. ................. 219/386 |
| 7,823,626 B2 * | 11/2010 | Mueller et al. .................. 165/61 |
| 7,946,220 B2 * | 5/2011 | Ose et al. ........................ 99/331 |

FOREIGN PATENT DOCUMENTS

| | | |
|---|---|---|
| JP | 01097177 | 6/1989 |
| JP | 08173278 A | 9/1996 |
| JP | 2001299313 A | 10/2001 |

* cited by examiner

REFRIGERATOR-OVEN COMBINATION FOR AN AIRCRAFT GALLEY FOOD SERVICE SYSTEM

CROSS-REFERENCES TO RELATED APPLICATIONS

This application is a divisional of application Ser. No. 11/114,902, filed Apr. 25, 2005, now U.S. Pat. No. 7,721,797, the entire contents of which are incorporated herein by reference.

BACKGROUND OF THE INVENTION

1. Field of the Invention

This invention relates to transport aircraft galley systems, and more particularly relates to a refrigerator-oven combination for heating of food, and storage of food and beverages.

2. General Background and State of the Art

Aircraft galley systems for modern transport aircraft incorporate self-contained refrigeration units which are cooled to prevent spoilage of food prior to distribution to passengers, and to keep beverages at desired serving temperatures. These self-contained refrigeration units have in the past been interfaced with cold air supply systems in the galley designed to cool the interiors of the self-contained refrigeration units. Conventional galley refrigeration systems typically utilize self-contained air chillers which provide the cooled air directly to the food carts or refrigerated compartments. Such air chillers are typically installed above, below or otherwise within close proximity of the galley, and deliver cooled air via air ducts.

Such aircraft galley systems also commonly contain separate ovens for heating food in the preparation of hot meals to be served aboard aircraft. Currently space must be allocated for each of the heating and cooling devices separately, either in the same galley or in different galleys.

With the advent of long-range flights and larger passenger loads, the demand for more food and beverages on aircraft has dramatically increased. The need to provide multiple meals on very long flights has required extensive food chilling compartments. Also, because of the length of flights, more hot meals are being served, requiring more oven space.

It would be desirable to provide a system for heating of food and cooling of food and beverages for aircraft galley systems that overcomes the shortcomings of current systems requiring separation of refrigerated spaces from oven spaces in aircraft, and conserves space and weight in aircraft in providing for both hot and cold food and beverage service. The present invention satisfies these and other needs.

INVENTION SUMMARY

Briefly, and in general terms, the invention provides for a refrigerator-oven combination for an aircraft galley food service system, that allows for efficient hot and cold food and beverage service and the conservation of space and weight in aircraft.

The present invention accordingly provides for a refrigerator-oven combination for an aircraft galley food service system, the refrigerator-oven combination having a heating mode for heating food items, and a refrigerator mode for cooling food and beverage items. The refrigerator-oven combination includes a housing defining a thermally insulated compartment, a heating device disposed in the thermally insulated compartment for heating at least a portion of an interior of the compartment, and a refrigeration device disposed in the thermally insulated housing for cooling at least a portion of the interior of the compartment.

The heating device may employ any common heating techniques, such as steam heating, radiant heating, convection heating, or combinations thereof. In one presently preferred aspect, the heating device includes an electric heater, which can be energized to provide conventional convection heating, as well as a steam injection valve, which allows hot moisture to be injected into the interior of the food compartment, to provide for additional heat and moisture during the heating mode. One or more temperature sensors may also be disposed in the compartment for measuring temperature in the compartment during the heating mode, and a timer may also be provided for controlling heating and cooking of food in the compartment.

The refrigeration device can either actively or passively cool at least a portion of the interior of the compartment for cold storage of food or beverages. In one presently preferred embodiment, a chilled fluid is supplied from a remote source, and is piped into a heat exchanger mounted to the compartment. Alternatively, the chilled fluid supplied from a remote source is piped through tube assemblies mounted to an internal wall of the compartment. One or more temperature sensors may be located within the compartment, and a regulating valve controls the temperature of the compartment by metering the flow of the chilled fluid through the heat exchanger or tube assemblies as a function of temperature sensed by the one or more temperature sensors.

In another presently preferred embodiment, a separate refrigeration unit is mounted to the back of the compartment and is used to directly provide chilled air during the food or beverage cold storage mode. In one presently preferred aspect, the separate refrigeration unit may be a thermoelectric cooling device attached to the compartment in order to provide cooling during the refrigeration mode. The refrigeration device typically would also include a system for automated defrosting of the interior of the compartment during the refrigeration mode, and a temperature control system receiving input from the one or more temperature sensors for controlling cooling temperatures to prevent freezing of the food. A motorized fan may also be provided in the compartment for circulating air within the compartment, to allow for rapid cooling of the contents of the refrigerator-oven combination, and the fan can be shut off when a desired chilled temperature is reached.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
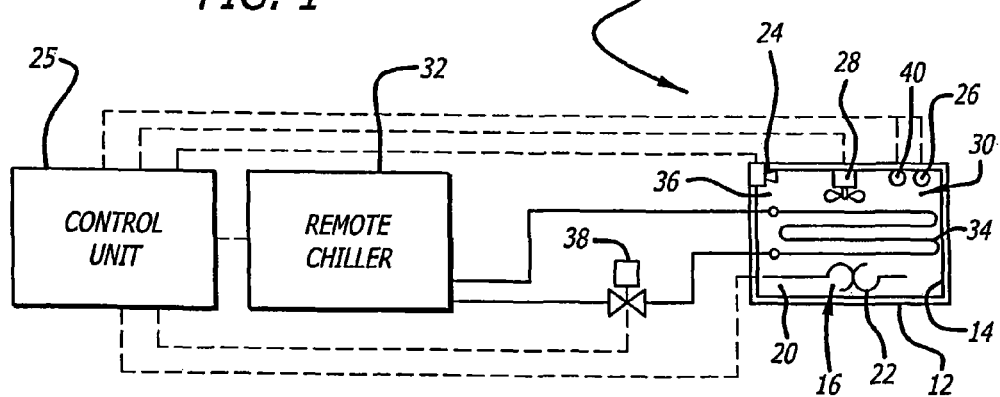
FIG. 1 is a schematic diagram of a first embodiment of a refrigerator-oven combination according to the present invention, in which cooling is provided by a chilled fluid supplied from a remote source to tubing in the compartment of the refrigerator-oven combination.

Referring to the drawings, which are provided for purposes of illustration and by way of example, the present invention provides for a refrigerator-oven combination for an aircraft galley food service system. The refrigerator-oven combination advantageously has a heating mode for heating food items, and a refrigerator mode for cooling food and beverage items, to permit for conservation of space and weight in an aircraft, while allowing for full hot and cold food and beverage service.

As is illustrated in FIG. 1, in one presently preferred embodiment, the refrigerator-oven combination 10 includes a housing 12 defining a thermally insulated compartment 14, typically including shelves and a door for access to the interior of the compartment. A heating device 16 is disposed in the thermally insulated compartment for heating at least a portion of the interior 20 of said compartment. The refrigerator-oven combination may employ any standard heating method including convection, radiant or steam heating. In a presently preferred aspect, the heating device includes an electric heater 22 in the compartment, which when energized provides conventional convection heating. In addition, the heating device preferably includes a steam injection valve 24 located in the compartment of the refrigerator-oven combination for providing heated steam from either a remote source of steam or directly from a supply of water that can be heated by a heating coil or other heater on demand, to allow hot moisture to enter the compartment. Steam can thus be injected via the valve for additional heat and moisture during the heating mode. Although the electric heater and steam heating are described as being used in combination, the compartment may be heated by the electric heater alone, or by steam heating alone, or alternatingly, as desired.

The temperature in the compartment during the heating mode can be monitored and controlled by a closed loop control unit 25 and one or more temperature sensors 26 located in the compartment, and by a timer (not shown) for measuring heating time. A motorized fan 28 may also be provided in the compartment for circulating air within the compartment, which is useful for improving efficiency of either the heating mode or the refrigeration mode, as will be further explained below.

As is illustrated in FIG. 1, in the first embodiment, a refrigeration device 30 is provided for the thermally insulated housing for cooling at least a portion of the interior of the compartment. The refrigeration device may be either active or passive, and is used to cool the interior of the compartment so that the compartment may also be used for cold storage of food or beverages. In a presently preferred embodiment, a chilled fluid is supplied from a remote source 32, and is piped through tube assemblies 34 mounted to an internal wall 36 of the interior of the compartment. The control unit and a regulating valve 38 control the temperature of the compartment by metering the flow of the chilled fluid through the tube assemblies as a function of one or more temperature sensors 40 located within the compartment.

Figure 2:
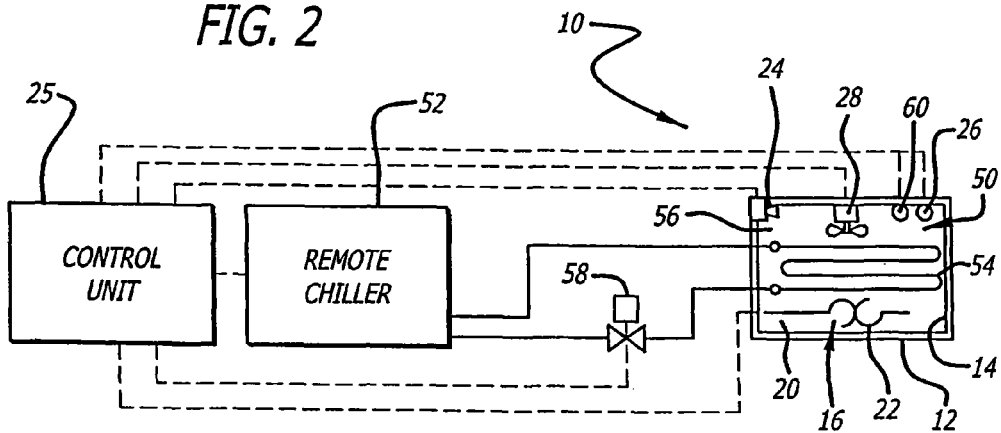
FIG. 2 is a schematic diagram of a second embodiment of a refrigerator-oven combination according to the present invention, in which cooling is provided by a chilled fluid supplied from a remote source to a heat exchanger mounted to the compartment of the refrigerator-oven combination.

Referring to FIG. 2, in a second embodiment, in which identical elements of the refrigerator-oven combination are identified with the same reference numbers as in the first embodiment, a refrigeration device 50 is provided for the thermally insulated housing for cooling at least a portion of the interior of the compartment, in which a chilled fluid is supplied from a remote source 52, and is piped into a heat exchanger 54 mounted to a wall 56 of the compartment. The control unit and a regulating valve 58 control the temperature of the compartment by metering the flow of the chilled fluid through the heat exchanger as a function of one or more temperature sensors 60 located within the compartment.

Figure 3:
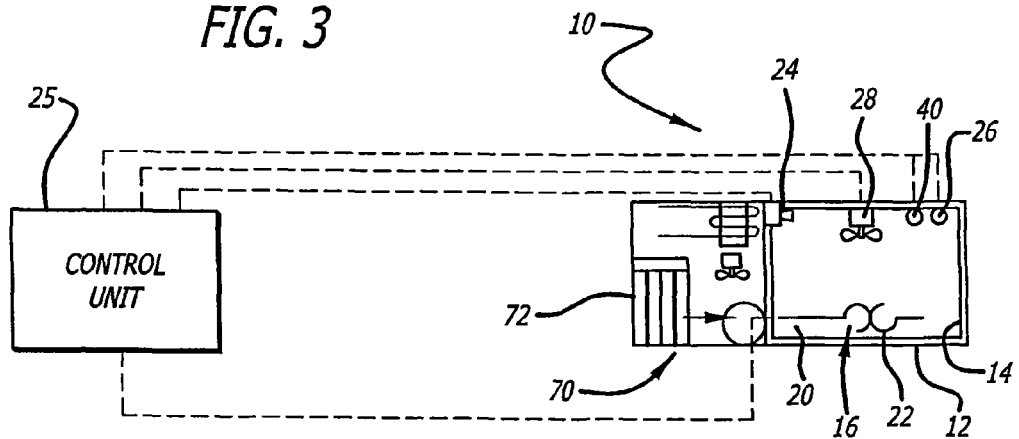
FIG. 3 is a schematic diagram of a third embodiment of a refrigerator-oven combination according to the present invention, in which cooling is provided by a refrigeration unit mounted to the compartment of the refrigerator-oven combination.

As is illustrated in FIG. 3, in a third embodiment, in which identical elements of the refrigerator-oven combination are identified with the same reference numbers as in the first embodiment, the refrigeration device 70 provided for the thermally insulated housing for cooling at least a portion of the interior of the compartment consists of a separate refrigeration unit 72 mounted to a wall of the compartment and controlled by the control unit to directly provide chilled air to the compartment during the food or beverage cold storage mode.

Figure 4:
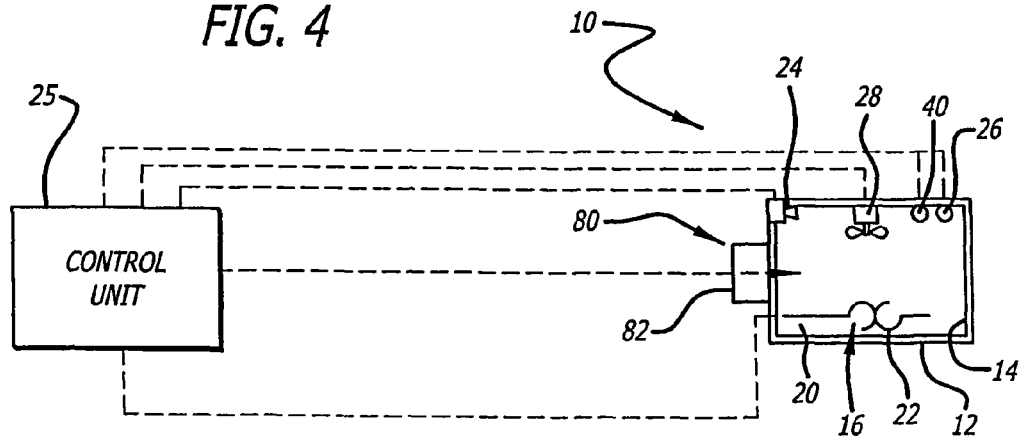
FIG. 4 is a schematic diagram of a fourth embodiment of a refrigerator-oven combination according to the present invention, including a thermoelectric cooling device.

Referring to FIG. 4, in a fourth embodiment, in which identical elements of the refrigerator-oven combination are identified with the same reference numbers as in the first embodiment, the refrigeration device 80 provided for the thermally insulated housing for cooling at least a portion of the interior of the compartment consists of a thermoelectric cooling device 82, such as a Peltier cooling device, for example, that is attached to a wall of the compartment and controlled by the control unit in order to provide cooling during the refrigeration mode.

Any of the foregoing refrigeration devices preferably would typically also include a system for automated defrosting of the interior during the refrigeration mode, and a temperature control system receiving input from the one or more temperature sensors for controlling cooling temperatures to prevent freezing of the food. The motorized fan may also be used in the compartment for circulating air within the compartment during the refrigeration mode, to allow for rapid cooling of the contents of the refrigerator-oven combination, and the fan can be shut off when a desired chilled temperature is reached.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A refrigerator-oven combination for an aircraft galley food service system, said refrigerator-oven combination having a heating mode for heating food items, and a refrigerator mode for cooling food and beverage items, the refrigerator-oven combination comprising:
    a housing defining a thermally insulated compartment, said thermally insulated compartment including a wall;
    a steam heating device including a steam injection valve disposed in said thermally insulated compartment for providing heated steam into said thermally insulated compartment for heating at least a portion of an interior of said thermally insulated compartment; and
    a thermoelectric cooling device mounted to said wall of said thermally insulated compartment for cooling at least a portion of the interior of said thermally insulated compartment.

2. The refrigerator-oven combination of claim 1, wherein said steam heating device further comprises a convection heating device.

3. The refrigerator-oven combination of claim 2, wherein said convection heating device comprises an electric heater.

4. The refrigerator-oven combination of claim 1, wherein said steam heating device further comprises a radiant heating device.

5. The refrigerator-oven combination of claim 1, further comprising a temperature sensor disposed in said thermally insulated compartment for measuring a temperature in the refrigerator-oven combination during the heating mode.

6. The refrigerator-oven combination of claim 1, wherein said steam heating device further comprises an electric heater.

7. A refrigerator-oven combination for an aircraft galley food service system, said refrigerator-oven combination having a heating mode for heating food items, and a refrigerator mode for cooling food and beverage items, the refrigerator-oven combination comprising:
- a housing defining a thermally insulated compartment, said thermally insulated compartment including a wall;
- a steam heating device including a steam injection valve disposed in said thermally insulated compartment for providing heated steam into said thermally insulated compartment for heating at least a portion of an interior of said thermally insulated compartment;
- a refrigeration device mounted to said wall of said thermally insulated compartment for cooling at least a portion of the interior of said thermally insulated compartment; and
- a motorized fan disposed in said thermally insulated compartment for circulating air within said thermally insulated compartment.

8. The refrigerator-oven combination of claim 7, wherein said steam heating device further comprises a convection heating device.

9. The refrigerator-oven combination of claim 8, wherein said convection heating device comprises an electric heater.

10. The refrigerator-oven combination of claim 7, wherein said steam heating device further comprises a radiant heating device.

11. The refrigerator-oven combination of claim 7, wherein said refrigeration device comprises an active refrigeration device.

12. The refrigerator-oven combination of claim 7, wherein said refrigeration device comprises a passive refrigeration device.

13. The refrigerator-oven combination of claim 7, wherein said refrigeration device comprises a heat exchanger mounted to said wall of said thermally insulated compartment and a chiller for supplying chilled fluid to said heat exchanger.

14. The refrigerator-oven combination of claim 13, wherein said refrigeration device further comprises at least one temperature sensor located within said thermally insulated compartment and a regulating valve connected to said chiller for metering the flow of the chilled fluid through said heat exchanger for controlling the temperature of said thermally insulated compartment responsive to said at least one temperature sensor.

15. The refrigerator-oven combination of claim 7, further comprising a temperature sensor disposed in said thermally insulated compartment for measuring a temperature in the refrigerator-oven combination during the heating mode.

16. The refrigerator-oven combination of claim 7, wherein said steam heating device further comprises an electric heater.

* * * * *